(12) United States Patent
Li et al.

(10) Patent No.: US 11,320,609 B2
(45) Date of Patent: May 3, 2022

(54) LIGHT EMITTING ASSEMBLY AND OPTICAL MODULE

(71) Applicant: Linktel Technologies Co., LTD, Hubei (CN)

(72) Inventors: Linke Li, Hubei (CN); Xuefeng Lin, Hubei (CN); Tianshu Wu, Hubei (CN); Xianwen Yang, Hubei (CN); Jian Zhang, Hubei (CN)

(73) Assignee: Linktel Technologies Co., LTD, Hubei (CN)

( * ) Notice: Subject to any disclaimer, the term of this patent is extended or adjusted under 35 U.S.C. 154(b) by 0 days.

(21) Appl. No.: 17/163,056

(22) Filed: Jan. 29, 2021

(65) Prior Publication Data

US 2021/0149132 A1 May 20, 2021

Related U.S. Application Data

(63) Continuation of application No. PCT/CN2018/106990, filed on Sep. 21, 2018.

(30) Foreign Application Priority Data

Aug. 31, 2018 (CN) .......................... 201811006706.3

(51) Int. Cl.
*H04B 10/00* (2013.01)
*G02B 6/42* (2006.01)
*G02B 6/293* (2006.01)

(52) U.S. Cl.
CPC ........... *G02B 6/4256* (2013.01); *G02B 6/293* (2013.01); *G02B 6/428* (2013.01); *G02B 6/4279* (2013.01); *G02B 6/4285* (2013.01)

(58) Field of Classification Search
CPC combination set(s) only.
See application file for complete search history.

(56) References Cited

U.S. PATENT DOCUMENTS 10,516,487 B1 * 12/2019 Kang .................... H04B 10/516
10,615,883 B1 * 4/2020 Cheng .................... H04B 10/67
(Continued)

FOREIGN PATENT DOCUMENTS

| CN | 103744145 B | 8/2016 |
|----|-------------|--------|
| CN | 206946027 U | 1/2018 |

(Continued)

OTHER PUBLICATIONS

International Search Report, PCT Patent Application No. PCT/CN2018/106990, dated Dec. 6, 2018, 2 pages.

*Primary Examiner* — Agustin Bello
(74) *Attorney, Agent, or Firm* — Adam R. Stephenson, Ltd.

(57) ABSTRACT

The present invention relates to the technical field of optical communication, and provides a light emitting assembly comprising: an LD chip component, an optical wavelength division multiplexer, a first package housing and a second package housing; the first package housing is fixedly connected with the second package housing to form a first chamber for packaging the LD chip component and a second chamber for packaging the optical wavelength division multiplexer, the first chamber is located inside the first package housing, and the second chamber is located inside the second package housing. The present invention also provides an optical module comprising: a housing, a light receiving assembly and the light emitting assembly mentioned above, wherein the light receiving assembly and the light emitting assembly are both disposed on the housing. The present invention adopts a two-section structure, so that the LD chip component and the optical wavelength division multiplexer are independently separated, and the optical signal processing is carried out in two steps, which not only improves the yield, but also facilitates the implementation of the mounting process. By adopting the optical fiber adapter (Continued)

set, the assembly tolerance can be effectively compensated by utilizing the flexibility of the optical fiber, the stress is eliminated, and the problem of light loss of the assembly stress is avoided.

15 Claims, 3 Drawing Sheets

(56) References Cited

U.S. PATENT DOCUMENTS

| | | | | |
|---|---|---|---|---|
| 10,897,122 | B2* | 1/2021 | Mathai | H01S 5/02253 |
| 2001/0043778 | A1* | 11/2001 | Griffis | G02B 6/29367 |
| | | | | 385/76 |
| 2002/0154855 | A1* | 10/2002 | Rose | G02B 6/29311 |
| | | | | 385/24 |
| 2003/0215240 | A1* | 11/2003 | Grann | G02B 6/29367 |
| | | | | 398/85 |
| 2011/0044069 | A1 | 2/2011 | Sato et al. | |
| 2013/0148966 | A1* | 6/2013 | Kurokawa | G02B 6/4213 |
| | | | | 398/65 |
| 2016/0004020 | A1* | 1/2016 | Shao | G02B 6/4246 |
| | | | | 385/24 |
| 2017/0038541 | A1* | 2/2017 | Fujimura | G02B 6/4215 |
| 2017/0131492 | A1* | 5/2017 | Vallance | G02B 6/4214 |
| 2017/0134099 | A1* | 5/2017 | Hara | G02B 6/29367 |
| 2017/0139162 | A1* | 5/2017 | Han | G02B 6/4281 |
| 2017/0315313 | A1* | 11/2017 | Cheng | G02B 6/4277 |
| 2017/0322381 | A1* | 11/2017 | Saeki | G02B 6/4201 |
| 2019/0007154 | A1* | 1/2019 | Nakayama | G02B 6/4261 |
| 2019/0052049 | A1* | 2/2019 | Sato | G02B 6/4201 |
| 2019/0187391 | A1* | 6/2019 | Fujimura | G02B 6/4214 |
| 2019/0250336 | A1* | 8/2019 | Guo | H04B 10/675 |
| 2020/0183104 | A1* | 6/2020 | Truong | G02B 6/3897 |
| 2020/0333639 | A1* | 10/2020 | Hirayama | H01S 5/02345 |
| 2020/0363595 | A1* | 11/2020 | Grann | G02B 6/4249 |
| 2021/0116643 | A1* | 4/2021 | Murao | G02B 6/2848 |
| 2021/0149131 | A1* | 5/2021 | Du | G02B 6/4209 |
| 2021/0149132 | A1* | 5/2021 | Li | G02B 6/293 |
| 2021/0263246 | A1* | 8/2021 | Yue | G02B 6/4215 |

FOREIGN PATENT DOCUMENTS

| | | |
|---|---|---|
| CN | 207135106 U | 3/2018 |
| CN | 207457557 U | 6/2018 |
| EP | 1011221 A2 | 6/2000 |

* cited by examiner

LIGHT EMITTING ASSEMBLY AND OPTICAL MODULE

CROSS-REFERENCE TO RELATED APPLICATIONS

This application is a continuation of International Application No. PCT/CN2018/106990, filed on Sep. 21, 2018, which claims the priority benefit of China Patent Application No. 201811006706.3, filed on Aug. 31, 2018. The contents of the above identified applications are incorporated herein by reference in their entirety.

FIELD OF THE TECHNOLOGY

The present invention relates to the technical field of optical communication, in particular to a light emitting assembly and an optical module.

BACKGROUND

The development direction of high-speed optical modules is always higher in speed, higher integration and smaller packaging, at present, a 100G QSFP28 optical transceiver module with a small packaging size has already obtained a large batch of applications in data centers and ethernet networks. The next generation of optical modules will be 200G, 400G in the coming years, and then develop to 800G, in order to fulfill the requirement of high density of optical interfaces of optical switches, the packaging size of 200G, 400G and even 800G optical modules is to be kept the same packaging size of QSFP28, which poses a very high challenge to the packaging design of optical modules. And the four main components of the optical module are a light emitting assembly, a light receiving assembly, a PCB and a package housing, wherein the packaging of the light emitting assembly is always the most difficult part.

At present, an integrated multiplexing optical assembly is generally configured in a high-speed optical module to reduce the overall size of the optical module. The conventional light emitting assembly generally comprises a package housing, an adapter assembly, a light emitting chip laser diode (LD), an optical wavelength division multiplexer (MUX), a lens, an isolator, a flexible circuit board (FPC), etc., wherein the package housing is mainly configured for fixing each optical component and the adapter component to achieve optical precise coupling, the optical module is configured for fixing the light emitting assembly by fixing the optical adapter assembly. The FPC is electrically connected with a PCB through welding for high-speed signals, and the assembly tolerance of the module and the package housing is compensated by the flexibility of the FPC. With the increasing of the speed, the application of the conventional packaging method to the next generation optical module becomes difficult.

Considering the signal yield and with the progress of the time, the required speed is higher and higher, the number of optical wavelength division multiplexer is inevitably required to be increased, so that more LD chips are required to be integrated in a miniaturized size, and devices in the package housing are inevitably excessive, and those skilled in the art know that the more devices, the lower the yield of the processed optical signal is, and the intensive mounting also affects the implementation of the mounting process and the batch manufacturing of the module.

In terms of signal quality, on the one hand, FPC generally has a longer length to accommodate assembly, which results in more signal loss, and on the other hand, FPC introduces discontinuities in impedance, such as solder pads, which also significantly increase high frequency signal loss, and with the increasing speed, such loss has more effect.

In terms of structure, in order to adapt to the welding FPC, the pad design cannot be too small, which leads to the reserved pad on the PCB occupying a lot of layout space. Similarly, with the increasing speed of the module, the number of channels of the module will increase, and this space occupation will become more serious, which makes the miniaturization packaging of the module more difficult.

SUMMARY

The object of the present invention is to provide a light emitting assembly and an optical module. By adopting a two-section structure, the LD chip component is separated from the optical wavelength division multiplexer. The optical signal processing is divided into two steps, which not only improves the yield, but also facilitates the implementation of the mounting process.

To achieve the above purpose, the embodiment of the present invention provides the following technical solution: a light emitting assembly, including an LD chip component, an optical wavelength division multiplexer, a first package housing and a second package housing;

The LD chip component is configured for transmitting and processing optical signals;

The first package housing is configured for packaging the LD chip component;

The optical wavelength division multiplexer is configured for receiving the optical signal processed by the LD chip component and combining them into one light beam;

The second package housing is configured for packaging the optical wavelength division multiplexer;

The first package housing is fixedly connected with the second package housing to form a first chamber for packaging the LD chip component and a second chamber for packaging the optical wavelength division multiplexer, the first chamber is located inside the first package housing, and the second chamber is located inside the second package housing.

Further, the second chamber has an opening sealed by the first package housing, and the optical signals emitted by the LD chip component enter the second chamber via the opening corresponding to the first package housing;

Further, the LD chip component includes an LD chipset, an LD output collimating lens set, and an isolator set;

The LD chipset is configured for transmitting optical signals;

The LD output collimating lens set is configured for shaping the optical signals;

The isolator set is configured for matching the wavelength of the optical signals and isolating a reflected light from entering the LD chipset;

The LD chip set, the LD output collimating lens set and the isolator set are disposed in sequence along the optical transmission path of the optical signals.

Further, a side wall of the first package housing away from the LD chip component is provided with a glass plate light window, and the optical signal emitted by the LD chip component passing through the glass plate light window and are transmitted to the optical wavelength division multiplexer.

Furthermore, the glass plate light window is inclined and has an angle with the side wall of the LD chip component, and the included angle ranges from 2 to 10 degrees.

Further, a coupling lens is disposed on one side of the second package housing away from the first package housing.

Furthermore, an optical fiber adapter set is further disposed on the second package housing, the optical fiber adapter set includes an optical fiber, a coupling ferrule and an adapter, two ends of the optical fiber are connected with the coupling ferrule and the adapter respectively, the coupling ferrule is connected with the coupling lens, and the adapter is configured for transmitting the optical signals to another optical module.

Furthermore, the first package housing and the second package housing are provided with a sealing cover plate respectively.

Furthermore, a groove is disposed on one side of the first package housing far away from the second package housing, the groove penetrates into the first package housing, and a PCB is disposed inside the groove, and the PCB and the LD chip component are welded together by a gold welding wire.

The embodiment of the present invention provides another technical solution that: an optical module comprises a housing, a light receiving assembly and the light emitting assembly, wherein the light receiving assembly and the light emitting assembly are disposed on the housing.

Compared with the prior art, the present invention has the following beneficial effects:
1. By adopting the two-section structure, the LD chip component and the optical wavelength division multiplexer are separated independently, and the optical signal processing is carried out in two steps, thereby improving the yield and being beneficial to the implementation of the mounting process.
2. The PCB and the light emitting assembly are welded via the gold welding wire, the length of the gold welding wire can be shortened according to actual needs, one the one hand, the impedance discontinuity of a signal transmission line is reduced, on the other hand, a gold welding pad on the PCB is far smaller than a FPC welding pad, board distribution space of the PCB is greatly saved, and the possibility of increasing the number of channels in the same volume is achieved.
3. By adopting the optical fiber adapter set, the assembly tolerance can be effectively compensated by utilizing the flexibility of the optical fiber, the stress is eliminated, and the problem of light loss of the assembly stress is avoided

In the figures:
1—LD chip component; 10—LD chip set; 100—LD chip; 11—LD output collimating lens set; 110—LD output collimating lens; 12—isolator set; 120—isolator; 2—optical wavelength division multiplexer; 3—first package housing; 30—first chamber; 31—glass plate light window; 32—groove; 4—second package housing; 40—second chamber; 41—coupling lens; 5—optical fiber adapter set; 50—optical fiber; 51—coupling ferrule; 52—adapter; 6—sealing cover plate; 7—PCB.

DETAILED DESCRIPTION

The technical solutions in the embodiments of the present invention are clearly and completely described below, and it is obvious that the described embodiments are only a part of the embodiments of the present invention, and not all of the embodiments. All other embodiments, which can be obtained by a person skilled in the art without making any creative effort based on the embodiments in the present invention, belong to the protection scope of the present invention.

Figure 1:
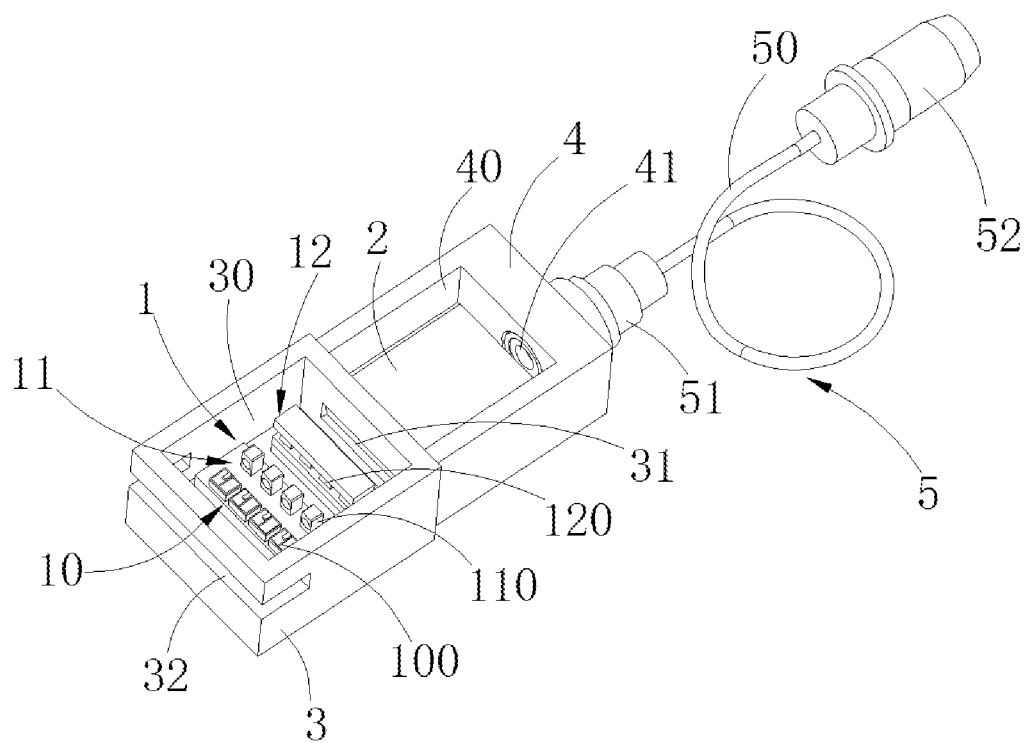
FIG. 1 is a schematic view of a light emitting assembly according to the embodiment of the present invention.

Referring to FIG. 1, the embodiment of the present invention provides a light emitting assembly, which comprises an LD chip component 1, an optical wavelength division multiplexer 2, a first package housing 3 and a second package housing 4, wherein the LD chip component 1 is configured for emitting and optimizing an optical signal; the first package housing 3 is configured for packaging the LD chip component 1; the optical wavelength division multiplexer 2 is configured for receiving the optical signal emitted by the LD chip component 1 and combining the optical signal into a beam of light; the second package housing 4 is configured for packaging the optical wavelength division multiplexer 2; the first package housing 3 and the second package housing 4 are fixedly connected to form a first chamber 30 for packaging the LD chip component 1 and a second chamber 40 for packaging the optical wavelength division multiplexer 2, the first chamber 30 is located inside the first package housing 3, and the second chamber 40 is located inside the second package housing 4. In order to meet the requirements of era, that is, the speed is higher and higher, and the number of optical wave multiplexing needs to be increased, and in consideration of the miniaturization of the packaging size, more LD chips capable of generating optical waves and other components matching the LD chips need to be integrated in one housing, and the increase of the components will inevitably cause the decrease of the yield. For example, when there is only one light wave, the yield may reach 98%, but if there are many light waves, the yield is reduced significantly due to the yield calculation is multiplied by multiple 98% s, and even more, there are other matched devices integrated in one housing for processing, which undoubtedly greatly affects the yield. Therefore, in this embodiment, the first package housing 3 is provided to separately package the LD chip component 1, the second package housing 4 is provided to separately package the optical wavelength division multiplexer 2. The LD chip component 1 and the optical wavelength division multiplexer 2 are separated, and the processing of the optical signal is performed in two steps, which not only improves the yield, but also is beneficial to the implementation of the mounting process.

As an optimized solution of the embodiment of the present invention, please refer to FIG. 1. The second chamber 40 has an opening sealed by the first package housing 3, and the optical signal emitted by the LD chip component 1 enters the second chamber 40 via the opening corresponding to the first package housing. In this embodiment, as shown in FIG. 1, the side of the second package housing 4 close to the first package housing 3 has no side wall, here is an opening, so that the first package housing 3 and the second package housing 4 share one side wall. This design saves a side wall compared to using two first package housings 3 to form two chambers. On the one hand, it reduces the processing requirements of the second package housing. On the other hand, it saves space and makes the assembly shorter in length.

As an optimized solution of the embodiment of the present invention, please refer to FIG. 1. The LD chip component 1 includes an LD chip set 10, an LD output collimating lens set 11, and an isolator set 12. The LD chip set 10 is configured for emitting optical signals; the LD output collimating lens set 11 is configured for shaping the optical signals; the isolator set 12 is configured for matching the wavelength of the optical signals and isolating the reflected light from entering the LD chip set 10; the LD chip set 10, the LD output collimating lens set 11, and the isolator set 12 are disposed in sequence along the optical transmission path of the optical signals. In this embodiment, the function of the LD chip set 10 is to emit optical signals of different wavelengths. For example, four LD chips are configured for emitting optical signals of four wavelengths $\lambda 1$, $\lambda 2$, $\lambda 3$, and $\lambda 4$, and the LD output collimating lens set 11 is configured for shaping the optical signals mentioned above, and then transmitting to the light waves through the isolator set 12 into the division multiplexer 2 and combing into one light beam. But reflected lights will appear in this process, and in order to prevent them from entering the LD chip, the isolator set 12 is configured for isolating the reflected lights to avoid high-speed optical signal degradation. The LD chip set 10, the LD output collimating lens set 11, and the isolator set 12 are all disposed inside the first package housing 3, and better optical signals can be obtained through their cooperative processing.

To further optimize the above solution, please refer to FIG. 1, the LD chip set 10 includes a plurality of LD chips, and the LD output collimating lens set 11 includes a plurality of LD output collimators lenses 110 corresponding to a plurality of LD chips 100 one to one. The isolator set 12 includes a plurality of isolators 120 corresponding to a plurality of the LD output collimating lenses one to one, and each of the LD chip 100 emits an optical signal, which is shaped by the corresponding LD output collimator lens 110, and then enters the optical wavelength division multiplexer 2 after passing through the corresponding isolator 120. In the present embodiment, the numbers of the LD chips 100, the LD output collimating lenses 110, and the isolators 120 are all the same, so that the one to one corresponding processing of the optical signals can be ensured. For example, two LD chips 100 are configured, and accordingly, there are two LD output collimating lenses 110 and two isolators 120. Preferably, the LD output collimating lens in this embodiment may adopt an LD coupling lens 41.

Figure 2:
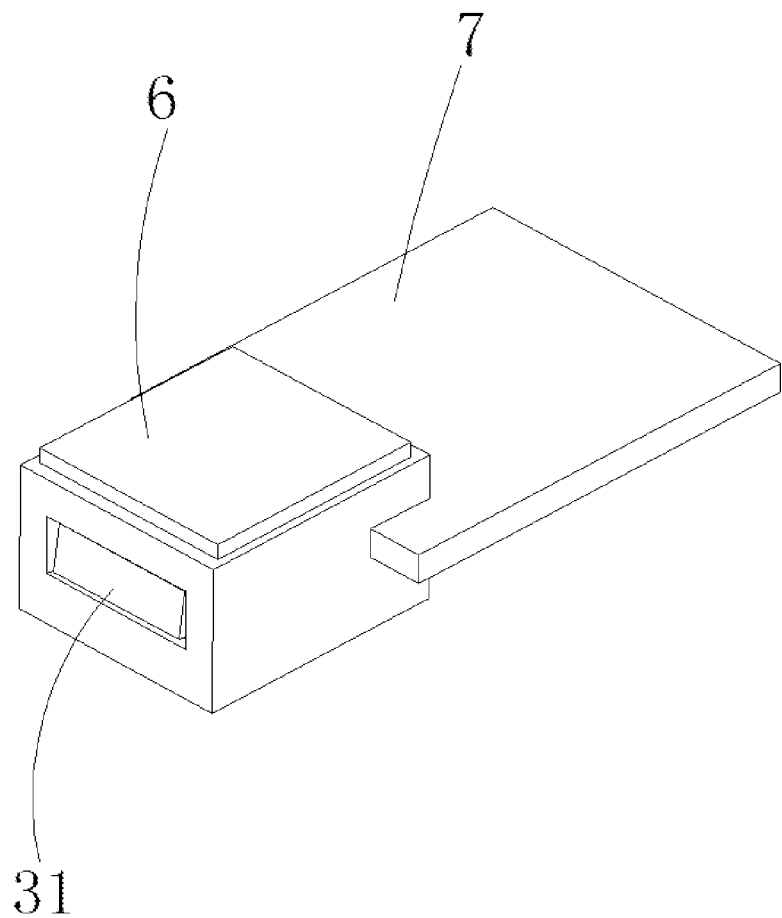
FIG. 2 is a schematic diagram of a first package housing, a sealing cover plate and a PCB mounting structure of a light emitting assembly according to the embodiment of the present invention.

As an optimized solution of the embodiment of the present invention, please refer to FIG. 1 and FIG. 2, a glass plate light window 31 is disposed on a side wall of the first package housing 3 away from the LD chip component 1, and the optical signal emitted by the LD chip component 1 is transmitted through the glass plate light window 31 and transmitted to the optical wavelength division multiplexer 2. In this embodiment, the optical signal can be easily transmitted from the first package housing 3 and transmitted into the optical wavelength division multiplexer 2 through the glass plate light window 31. As a preferable solution of the embodiment, the glass plate light window 31 is obliquely disposed, and has an included angle with the side wall. The included angle ranges from 2 to 10 degrees. Through the inclined state, the light reflection caused by the glass light window can be reduced, and when the included angle is 8 degrees, the light reflection can be reduced significantly.

As an optimized solution of the embodiment of the present invention, please refer to FIG. 1, the coupling lens 41 is disposed on one side of the second package housing 4 away from the first package housing 3. The coupling lens 41 is configured for receiving and coupling the optical signals synthesized by the optical wavelength division multiplexer 2. In this embodiment, the coupling lens 41 can again perform beam shaping on the optical signal processed by the optical wavelength division multiplexer 2 so as to be transmitted to the light receiving assembly of another optical module.

Figure 3:
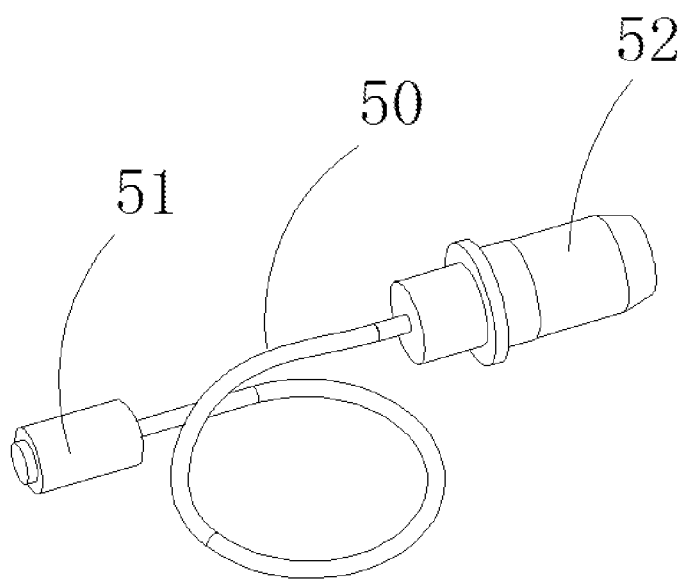
FIG. 3 is a schematic diagram of an optical fiber adapter set of a light emitting assembly according to an embodiment of the present invention.

To further optimize the above solution, please refer to FIG. 1 and FIG. 3, the second package housing 4 is also equipped with an optical fiber adapter set 5 which includes an optical fiber 50, a coupling ferrule 51 and an adapter 52. Both ends of the optical fiber 50 are connected with the coupling ferrule 51 and the adapter 52 respectively, the coupling ferrule 51 is connected with the coupling lens 41, and the adapter 52 is configured for transmitting optical signals to another optical module. In the present embodiment, the purpose of the fiber optic adapter set 5 is to transmit optical signals to another optical module. By adopting this transmission mode, one the one hand, the defect that the space in the existing module is small and the packaging is difficult can be overcome. Because the flexible characteristic of the optical fiber 50 can be utilized, the coupled optical signal after wave combination is transmitted to another optical module in a small space according to a special bending method. On the other hand, the defect that the assembly tolerance and the stress inevitably due to the hard connection between the existing optical assembly and the PCB 7 can be overcome. The assembly tolerance is effectively compensated and the stress is eliminated by utilizing the flexibility of the optical fiber 50, so that the problem that the optical assembly is stressed and light lose can be avoided.

Referring to FIG. 2 as an optimized solution of the embodiment of the present invention, the first package housing 3 and the second package housing 4 are both provided with a sealing cover plate 6, one of the sealing cover plates 6 is configured for packaging the LD chip component 1 in the first package housing 3, and the other sealing cover is configured for packaging the optical wavelength division multiplexer 2 in the second package housing 4. In this embodiment, the mounting of the sealing cover plate 6 can play the roles of dust prevention and water vapor isolation, thereby improving the reliability.

As an optimized solution of the embodiment of the present invention, please refer to FIG. 1 and FIG. 2, a groove 32 is disposed on one side of the first package housing 3 far away from the second package housing 4. A PCB 7 is disposed inside the groove 32, and the PCB 7 is welded to the groove 32 through a gold welding wire. In the present embodiment, the groove 32 is configured for inserting the optical module PCB 7, and the thickness of the groove 32 is slightly greater than the thickness of the PCB 7, so that gold welding wire can connect the PCB and the LD chip. The welding wire is short enough, so the impedance discontinuity of the signal transmission line is reduced, and the problem of insufficient space of the PCB 7 due to an excessively large welding pad caused by FPC (flexible circuit board) connection in the prior art is avoided, and it is possible to increase the number of channels in the same volume.

As an optimized solution of the embodiment of the present invention, the places to be connected are filled and sealed by glue, for example, the first package housing 3, the glass optical window, the PCB 7 and the sealing cover plate 6 are filled and sealed by glue, so that the dust prevention and water vapor isolation effects can be achieved, and the reliability can be improved.

The embodiment of the present invention provides an optical module which comprises a housing, a light receiving assembly and the light emitting assembly, wherein the light receiving assembly and the light emitting assembly are disposed on the housing. In this embodiment, the light emitting assembly can be configured in a conventional light module to improve the yield and benefit to the implementation of the mounting process, and welded through the gold welding wire, the length of the gold welding wire can be shortened according to actual needs, one the one hand, impedance discontinuity of a signal transmission line is reduced, on the other hand, a gold welding pad on the PCB is far smaller than a FPC welding pad, board distribution space of the PCB is greatly saved, and the possibility of increasing the number of channels in the same volume is achieved. By adopting the optical fiber adapter set 5, the assembly tolerance can be effectively compensated by utilizing the flexibility of the optical fiber, the stress is eliminated, and the problem of stress and light lose of the component is avoided.

As an optimized solution of the embodiment of the present invention, there may be two sets of the light emitting assemblies and the light receiving assemblies, so as to achieve dual emission and dual reception, that is, the two light emitting assemblies are disposed side by side, the two light receiving assemblies are also disposed side by side, and a certain distance is reserved between the two light emitting assemblies and the two light receiving assemblies, so as to ensure that the optical fibers 50 of the light receiving assemblies can be extended. By adopting the mode of dual emission and dual reception, not only can reduce the quantity of required wavelength, but also be favorable to the manufacturing and designing of chip. Two light emitting assemblies and two light receiving assemblies dislocated one after the other can effectively solve the problem of small space.

As an optimization solution of the embodiment of the present invention, the optical fibers in the above two sets of light emitting assemblies are defined as the first optical fiber and the second optical fiber, and the bending mode of the first optical fiber and the second optical fiber is optimized. The first optical fiber and the second optical fiber are both bent into a ring shape, and both are located above the two second package housings 4 and located in the mounting area of the housing. In this embodiment, the first optical fiber is emitted from the end of the second package housing 4, bends in the direction of the adjacent second package housing 4, and then continues to bend back, finally forming a ring shape and connecting to another optical module; similarly, the second optical fiber is emitted from the end of the second package housing 4, bends in the direction of the adjacent second package housing 4, and then continues to bend back to form a final a ring, and connected to another optical module. When bending, try to bend in a large circle as long as it does not exceed the range of the housing. Through this bending method, it can be ensured to the greatest extent that the head and tail ends of the optical fiber are not damaged when they are bent, and the purpose of transmitting optical signals is also achieved.

Although the embodiments of the present invention have been shown and described, those skilled in the art can understand that various changes, modifications, substitutions and variants can be made to these embodiments without departing from the principle and spirit of the present invention. The scope of the present invention is defined by the appended claims and their equivalents.

The invention claimed is:

1. A light emitting assembly, comprising:
a laser diode (LD) chip component, an optical wavelength division multiplexer, a first package housing and a second package housing, wherein:
the LD chip component is configured for transmitting and processing optical signals;
the first package housing is configured for packaging the LD chip component;
the optical wavelength division multiplexer is configured for receiving the optical signals processed by the LD chip component and combining them into one light beam;
the second package housing is configured for packaging the optical wavelength division multiplexer;
the first package housing is fixedly connected with the second package housing to form a first chamber for packaging the LD chip component and a second chamber for packaging the optical wavelength division multiplexer, where the first chamber is located inside the first package housing and the second chamber is located inside the second package housing; and
wherein a side wall of the first package housing away from the LD chip component comprises a glass plate light window embedded therein inclined at an angle between 2 degrees to 10 degrees to the side wall; and
wherein the optical signals emitted by the LD chip component passing through the glass plate light window are transmitted to the optical wavelength division multiplexer.

2. The light emitting assembly according to claim 1, wherein the second chamber has an opening sealed by the first package housing, and the optical signals emitted by the LD chip component enter the second chamber via the opening corresponding to the first package housing.

3. The light emitting assembly according to claim 1, wherein the LD chip component includes an LD chipset, an LD output collimating lens set, and an isolator set, wherein:
the LD chipset is configured for transmitting optical signals;
the LD output collimating lens set is configured for shaping the optical signals;
the isolator set is configured for matching a wavelength of the optical signals and isolating a reflected light from entering the LD chipset; and
the LD chip set, the LD output collimating lens set and the isolator set are disposed in sequence along a optical transmission path of the optical signals.

4. The light emitting assembly according to claim 1, wherein a coupling lens is disposed on one side of the second package housing away from the first package housing.

5. The light emitting assembly according to claim 4, wherein an optical fiber adapter set is further disposed on the second package housing, the optical fiber adapter set includes an optical fiber, a coupling ferrule and an adapter and:
two ends of the optical fiber are connected with the coupling ferrule and the adapter, respectively;
the coupling ferrule is connected with the coupling lens; and
the adapter is configured for transmitting the optical signals to another optical module.

6. The light emitting assembly according to claim 1, wherein the first package housing and the second package housing are provided with a sealing cover plate, respectively.

7. The light emitting assembly according to claim 1, wherein a groove is disposed on one side of the first package housing far away from the second package housing, the groove penetrates into the first package housing, and a PCB is disposed inside the groove, and the PCB and the LD chip component are welded together by a gold welding wire.

8. The light emitting assembly according to claim 1, further comprising:
an optical module, comprising:
a housing;
a light receiving assembly; and
the light emitting assembly;
wherein the light receiving assembly and the light emitting assembly are both disposed on the housing.

9. An optical module comprising:
a housing;
a light receiving assembly; and
a light emitting assembly comprising:
a laser diode (LD) chip component, an optical wavelength division multiplexer, a first package housing and a second package housing, wherein:
the LD chip component is configured for transmitting and processing optical signals;
the first package housing is configured for packaging the LD chip component;
the optical wavelength division multiplexer is configured for receiving the optical signals processed by the LD chip component and combining them into one light beam;
the second package housing is configured for packaging the optical wavelength division multiplexer;
the first package housing is fixedly connected with the second package housing to form a first chamber for packaging the LD chip component and a second chamber for packaging the optical wavelength division multiplexer, where the first chamber is located inside the first package housing and the second chamber is located inside the second package housing; and
wherein a side wall of the first package housing away from the LD chip component comprises a glass plate light window embedded therein inclined at an angle between 2 degrees to 10 degrees to the side wall;
wherein the optical signals emitted by the LD chip component passing through the glass plate light window are transmitted to the optical wavelength division multiplexer; and
wherein the light receiving assembly and the light emitting assembly are both disposed on the housing.

10. The light emitting assembly according to claim 9, wherein the second chamber has an opening sealed by the first package housing, and the optical signals emitted by the LD chip component enter the second chamber via the opening corresponding to the first package housing.

11. The light emitting assembly according to claim 9, wherein the LD chip component includes an LD chipset, an LD output collimating lens set, and an isolator set, wherein:
the LD chipset is configured for transmitting optical signals;
the LD output collimating lens set is configured for shaping the optical signals;
the isolator set is configured for matching a wavelength of the optical signals and isolating a reflected light from entering the LD chipset; and
the LD chip set, the LD output collimating lens set and the isolator set are disposed in sequence along an optical transmission path of the optical signals.

12. The light emitting assembly according to claim 9, wherein a coupling lens is disposed on one side of the second package housing away from the first package housing.

13. The light emitting assembly according to claim 12, wherein an optical fiber adapter set is further disposed on the second package housing, the optical fiber adapter set includes an optical fiber, a coupling ferrule and an adapter and:
two ends of the optical fiber are connected with the coupling ferrule and the adapter, respectively;
the coupling ferrule is connected with the coupling lens; and
the adapter is configured for transmitting the optical signals to another optical module.

14. The light emitting assembly according to claim 9, wherein the first package housing and the second package housing are provided with a sealing cover plate, respectively.

15. The light emitting assembly according to claim 9, wherein a groove is disposed on one side of the first package housing far away from the second package housing, the groove penetrates into the first package housing, and a PCB is disposed inside the groove, and the PCB and the LD chip component are welded together by a gold welding wire.

* * * * *